United States Patent
Oh et al.

(10) Patent No.: US 12,000,589 B2
(45) Date of Patent: Jun. 4, 2024

(54) JET NOZZLE, COMBUSTOR, AND GAS TURBINE INCLUDING SAME

(71) Applicant: DOOSAN ENERBILITY CO., LTD., Changwon-si (KR)

(72) Inventors: Kyoung Taek Oh, Hwaseong (KR); Sang Pil Jo, Sejong (KR); Young Gun Go, Yongin (KR)

(73) Assignee: DOOSAN ENERBILITY CO., LTD, Changwon (KR)

( * ) Notice: Subject to any disclaimer, the term of this patent is extended or adjusted under 35 U.S.C. 154(b) by 0 days.

(21) Appl. No.: 18/328,822

(22) Filed: Jun. 5, 2023

(65) Prior Publication Data
US 2024/0003545 A1    Jan. 4, 2024

(30) Foreign Application Priority Data

Jun. 30, 2022 (KR) .................. 10-2022-0080429

(51) Int. Cl.
*F23R 3/28* (2006.01)
*F02C 7/232* (2006.01)

(52) U.S. Cl.
CPC .............. *F23R 3/286* (2013.01); *F02C 7/232* (2013.01); *F05D 2220/32* (2013.01); *F05D 2240/36* (2013.01)

(58) Field of Classification Search
CPC ........ F05D 2240/36; F23R 3/045; F23R 3/12; F23R 3/20; F23R 3/286; F23R 3/32; F23R 3/34; F23R 3/346
See application file for complete search history.

(56) References Cited

U.S. PATENT DOCUMENTS

| | | | | |
|---|---|---|---|---|
| 2,967,394 | A  * | 1/1961  | Jensen | F23R 3/20 60/737 |
| 3,913,318 | A  * | 10/1975 | Fox    | F23R 3/32 60/738 |
| 2002/0179740 | A1 | 12/2002 | Dantes | |
| 2011/0296839 | A1 | 12/2011 | Van Nieuwenhuizen | |
| 2014/0060059 | A1 * | 3/2014 | Brogan | F23R 3/20 60/740 |
| 2014/0338357 | A1 * | 11/2014 | Lovett | F23R 3/60 60/734 |
| 2016/0363319 | A1 * | 12/2016 | Monahan | F23D 14/64 |
| 2018/0010563 | A1 | 1/2018 | Ryon | |
| 2021/0199299 | A1 * | 7/2021 | Berry | F23R 3/286 |

FOREIGN PATENT DOCUMENTS

JP       2017-527765 A    9/2017

* cited by examiner

*Primary Examiner* — Scott J Walthour
(74) *Attorney, Agent, or Firm* — Harvest IP Law (57) ABSTRACT

Proposed are a jet nozzle, and a combustor and a gas turbine including the jet nozzle. The jet nozzle is formed on an inner surface of a combustor to supply fluid into an interior of a liner of the combustor in a direction intersecting with a progress direction of combustion gases primarily combusted in a combustion chamber in the interior of the liner. The jet nozzle includes a fluid inlet, through which fluid is externally introduced, and a fluid outlet including a first fluid outlet member, through which a portion of the fluid introduced through the fluid inlet is discharged so as to be rotated in one direction, and a second fluid outlet member, through which the rest of the fluid is discharged so as to be rotated in a direction different from the rotation direction of the fluid discharged from the first fluid outlet member.

20 Claims, 5 Drawing Sheets

JET NOZZLE, COMBUSTOR, AND GAS TURBINE INCLUDING SAME

CROSS REFERENCE TO RELATED APPLICATION

The present application claims priority to Korean Patent Application No. 10-2022-0080429, filed on Jun. 30, 2022, the entire contents of which are incorporated herein for all purposes by this reference.

BACKGROUND OF THE INVENTION

1. Field of the Invention

The present disclosure relates to a jet nozzle, a combustor, and a gas turbine including the same. More particularly, the present disclosure relates to a jet nozzle formed on an inner surface of a combustor to supply a fluid utilized for secondary combustion in a combustion chamber inside a liner of the combustor.

2. Description of the Background Art

A turbomachine refers to an apparatus that generates power by utilizing a fluid (for example, gas) that passes through the turbomachine. Therefore, the turbomachine is usually installed and used together with a generator. Such a turbomachine may include a gas turbine, a steam turbine, a wind power turbine, and the like. The gas turbine is an apparatus that mixes compressed air and fuel (e.g., natural gas) and combusts an air-fuel mixture to generate combustion. This combustion process in turn generates power for various power generation applications. The steam turbine is an apparatus that heats water to generate steam, which in turn generates power for various power generation applications. The wind turbine is an apparatus that converts wind power into power for various power generation applications.

Among the turbomachines, the gas turbine includes a compressor, a combustor, and a turbine. The compressor has a plurality of compressor vanes and compressor blades alternately arranged within a compressor casing. In addition, the compressor sucks external air through a compressor inlet scroll strut. The sucked air is compressed by the compressor vanes and the compressor blades while passing through an interior of the compressor. The combustor receives the compressed air from the compressor and mixes the compressed air with fuel to form a air-fuel mixture.

In addition, the combustor ignites the fuel-air mixture with an igniter to generate high-temperature and high-pressure combustion gas. The generated combustion gas is supplied to the turbine. In the turbine, a plurality of turbine vanes and turbine blades are arranged in a turbine casing. The combustion gas generated by the combustor passes through the turbine. While passing through an interior of the turbine, the combustion gas rotates the turbine blades and then is discharged to the outside through a turbine diffuser.

Among the turbomachines, the steam turbine includes an evaporator and a turbine. The evaporator heats water supplied from the outside to generate steam. In the turbine, a plurality of turbine vanes and turbine blades are alternately disposed in a turbine casing, similarly to the turbine in a gas turbine. However, in the turbine in the steam turbine, the steam generated in the evaporator, instead of the combustion gas, passes through the turbine to rotate the turbine blades.

In the combustor, when secondary combustion is performed using combustion gases produced during primary combustion of compressed air and fuel, the secondary combustion is performed after the combustion gases are mixed with fluid supplied into the interior of a liner. In this case, it is required to increase the mixing rate of the combustion gases and the fluid, and research is being conducted on this.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a jet nozzle which can increase the mixing rate of combustion gases moved to a turbine section after being first combusted in a combustion chamber formed inside a liner of a combustor and a fluid for secondary combustion of the combustion gases by improving a nozzle structure for the fluid, a combustor, and a gas turbine including the former components.

According to an aspect of the present disclosure, there is provided a jet nozzle formed on an inner surface of a combustor to supply fluid into an interior of a liner of the combustor in a direction intersecting with a progress direction of combustion gases primarily combusted in a combustion chamber in the interior of the liner, the jet nozzle including: a fluid inlet, through which fluid is externally introduced; and a fluid outlet including a first fluid outlet member, through which a portion of the fluid introduced through the fluid inlet is discharged so as to be rotated in one direction, and a second fluid outlet member, through which the rest of the fluid is discharged so as to be rotated in a direction different from the rotation direction of the fluid discharged from the first fluid outlet member.

The fluid outlet may be arranged in a direction intersecting with a direction in which the fluid is introduced from the fluid inlet, wherein the fluid is fuel or a fuel mixture.

The first outlet member of the fluid outlet may have a cylindrical shape having a closed end, an open end opposite to the closed end, and a first inlet part provided on a first peripheral side thereof in communication with the fluid inlet, and the second outlet member may have a cylindrical shape having a closed end, an open end opposite to the closed end, and a second inlet part provided on a second peripheral side thereof in communication with the fluid inlet, so that fluid introduced into the first outlet member and the second outlet member through the first inlet part and the second inlet part is discharged through the open ends of the first and second outlet members.

The first outlet member and the second outlet member may have the same diameter, and a partition wall may be provided at the connection of the first outlet member and the second outlet member so as to extend toward the fluid inlet, wherein the first outlet member and the second outlet member are disposed symmetrically with respect to the partition wall.

The fluid outlet may further include a casing in which the first outlet member and the second outlet member are seated, the casing including a closed end, an open end opposite to the closed end, and an elongated through-hole provided on a peripheral side of the casing, through which the fluid inlet is fitted in communication with the first and second inlet parts.

A guide part may be integrally formed at the open end of the casing to extend at an inclined angle toward an interior of the casing from a point where the open ends of the first and second outlet members are located in order to guide the discharge of the fluid, wherein a fluid outlet hole is provided at a distal end of the guide part.

According to another aspect of the present disclosure, there is provided a combustor provided to mix compressed air supplied from a compressor of a gas turbine and fuel supplied from a fuel injector to form a compressed air-fuel mixture, to combust the mixture to produce combustion gases, and to supply the combustion gases to a turbine section of the gas turbine, the combustor including: a nozzle casing; a liner connected to a turbine section-side end of the nozzle casing and having a combustion chamber in which the compressed air-fuel mixture is combusted; a transition piece connected to a turbine section-side end of the liner to supply combustion gas generated in the combustion chamber to the turbine section; a nozzle assembly disposed in the nozzle casing to inject fuel and compressed air into the combustion chamber; and a jet nozzle configured to supply fluid into an interior of a liner in a direction intersecting with a progress direction of combustion gases primarily combusted in the combustion chamber in the interior of the liner, the jet nozzle including: a fluid inlet, through which fluid is externally introduced; and a fluid outlet including a first fluid outlet member, through which a portion of the fluid introduced through the fluid inlet is discharged so as to be rotated in one direction, and a second fluid outlet member, through which the rest of the fluid is discharged so as to be rotated in a direction different from the rotation direction of the fluid discharged from the first fluid outlet member.

According to a further aspect of the present disclosure, there is provided a gas turbine including: a compressor provided to compress air introduced from the outside; a combustor provided to mix the compressed air supplied from the compressor with fuel supplied from a fuel injector and combust the air-fuel mixture; and a turbine section provided to generate power for generating electricity while the combustion gases supplied from the combustor flow therethrough, the combustor including: a nozzle casing; a liner connected to a turbine section-side end of the nozzle casing and having a combustion chamber in which the compressed air-fuel mixture is combusted; a transition piece connected to a turbine section-side end of the liner to supply the combustion gases generated in the combustion chamber to the turbine section; a nozzle assembly disposed in the nozzle casing to inject fuel and compressed air into the combustion chamber; and a jet nozzle configured to supply fluid into an interior of the liner in a direction intersecting with a progress direction of the combustion gases primarily combusted in the combustion chamber in the interior of the liner, the jet nozzle including: a fluid inlet, through which fluid is externally introduced; and a fluid outlet including a first fluid outlet member, through which a portion of the fluid introduced through the fluid inlet is discharged so as to be rotated in one direction, and a second fluid outlet member, through which the rest of the fluid is discharged so as to be rotated in a direction different from the rotation direction of the fluid discharged from the first fluid outlet member.

According to the jet nozzle, combustor, and gas turbine of the present disclosure, fluid is supplied into the interior of a liner of the combustor through a communication port formed on the peripheral surface of the liner in a direction intersecting with a progress direction of combustion gases that is moved to the turbine section in the interior of the liner after being primarily combusted so that second combustion can be carried out in the interior of the liner, thereby increasing combustion efficiency, and a portion of the fluid is supplied so as to be rotated in one direction and the rest of the fluid is supplied so as to be rotated in a direction different from the rotation direction of the former fluid, thereby increasing the mixing rate of combustion gases and fuel.

DETAILED DESCRIPTION OF THE INVENTION

Hereinafter, preferred embodiments according to the present disclosure will be described in detail with reference to the accompanying drawings. Prior to describing the present disclosure, the terms or words used herein should not be construed as being limited to conventional or dictionary meanings, but may only construed as meanings and concepts consistent with the technical idea of the present disclosure on the basis of the principle that the inventors can properly define the meanings and concepts of the terms in order to best describe this invention.

Also, the use of the terms "a" and "an" and "the" and similar references in the context of describing the embodiments are to be construed to cover both the singular and the plural, unless otherwise indicated herein or clearly contradicted by context. Further, terms such as "includes," "comprises," and "have/has" should be construed as designating that there are such features, integers, steps, operations, elements, components, and/or combinations thereof, not to exclude the presence or possibility of adding of one or more of other features, integers, steps, operations, elements, components, and/or combinations thereof.

Exemplary embodiments will be described in detail with reference to the accompanying drawings. It should be noted that like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Figure 1:
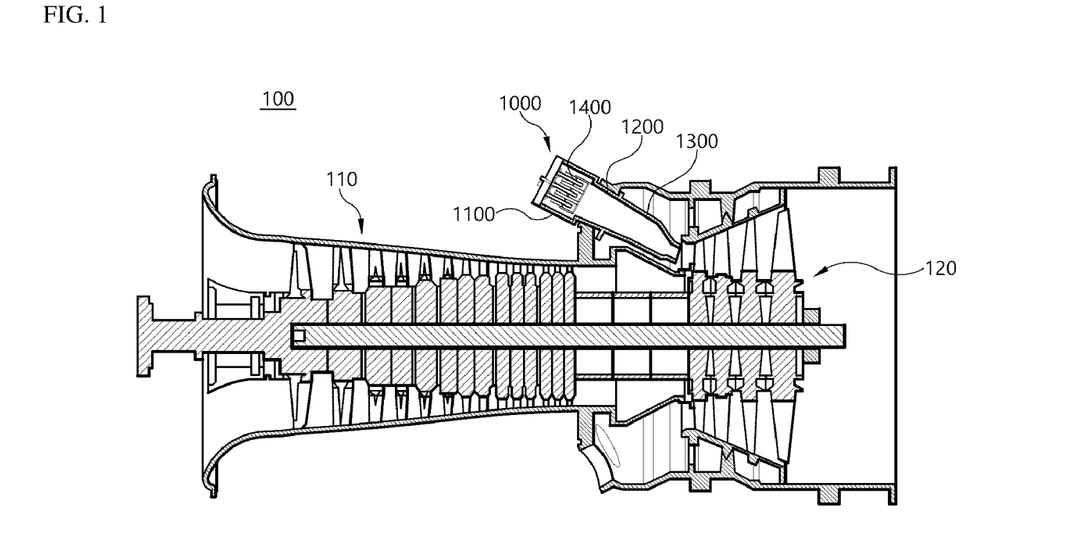
FIG. 1 is a cross-sectional view illustrating a gas turbine according to the present disclosure.

Referring to FIG. 1, a gas turbine 100 includes a compressor 110, a combustor 1000, and a turbine section 120. In a flow direction of gas (compressed air or combustion gas), the compressor 110 is disposed on the upstream side of the gas turbine 100, and the turbine section 120 is disposed on the downstream side of the gas turbine. In addition, the combustor 1000 is arranged between the compressor 110 and the turbine section 120.

The compressor 110 accommodates, inside a compressor casing, compressor vanes and a compressor rotor which include a compressor disk and compressor blades, and the turbine section 120 accommodates, inside a turbine casing, turbine vanes and a turbine rotor which includes a turbine disk and turbine blades. These compressor vanes and the compressor rotor are arranged in a multi-stage along a flow direction of compressed air, and the turbine vanes and the turbine rotor are also arranged in a multi-stage along a flow direction of combustion gas.

At this time, it is preferably designed such that the compressor 110 has an internal space of which the volume decreases from the front-stage toward the rear-stage so that the intake air can be compressed, whereas the turbine 120 has an internal space of which the volume increases from the front-stage toward the rear-stage so that the combustion gas supplied from the combustor 1000 can expand.

On the other hand, between the compressor rotor located on the rear end side of the compressor 1000 and the turbine rotor located on the front end side of the turbine section 120, a torque tube is disposed as a torque transmission member to transmit the rotational torque generated by the turbine section 120 to the compressor 110. Although the torque tube may be composed of a plurality of torque tube disks arranged in three stages in total as illustrated in FIG. 1, this is only one of several embodiments of the present disclosure, so the torque tube may be composed of a plurality of torque tube disks arranged in four or more stages or two or fewer stages.

The compressor rotor includes a compressor disk and a compressor blade. A plurality of (e.g., 14) compressor disks are provided inside the compressor casing, and the respective compressor disks are fastened so as not to be spaced apart each other in the axial direction by a tie rod. More specifically, the respective compressor disks are aligned along the axial direction with the tie rod passing through the central portion thereof. In addition, adjacent compressor disks are arranged such that the opposing surfaces of the adjacent compressor disks are compressed by the tie rod so that the adjacent compressor disks cannot rotate relative to each other.

The plurality of compressor blades is radially coupled to an outer circumferential surface of the compressor disk in a multi-stage. Further, the plurality of compressor vanes is arranged in a multi-stage on an inner circumferential surface of the compressor casing such that each stage of compressor vanes is disposed between adjacent stages of compressor blades. Unlike the compressor disk, the compressor vanes maintain a fixed state so as not to rotate, and serve to guide the compressed air, which passed through an upstream-side stage of compressor blades, toward a downstream-side stage of compressor blades. Here, the compressor casing and the compressor vanes may be collectively defined as a compressor stator, in terms of that they do not rotate, to distinguish them from the compressor rotor, which rotates.

The tie rod is arranged to penetrate the center of the plurality of compressor disks and turbine disks, which will be described later, such that one end thereof is fastened in the compressor disk located on the foremost end side of the compressor and the other end thereof is fastened by a fastening nut.

Since the tie rod may be formed in various structures depending on the gas turbine, the shape of the tie rod is not necessarily limited to the shape illustrated in FIG. 1. That is, as illustrated, for example, one tie rod may have a form in which the tie rod passes through the central portion of the compressor disks and the turbine disks, a form in which the plurality of tie rods are arranged in a serial manner, or a combination thereof.

Although not illustrated in FIG. 1, the compressor of the gas turbine may be provided with a deswirler that serves as a guide for increasing a pressure of fluid and adjusting a flow angle of the fluid entering a combustor inlet to a designed flow angle.

The combustor 1000 serves to mix an incoming compressed air with fuel supplied from a fuel injector (not shown) and combust the air-fuel mixture to produce high-temperature, high-pressure combustion gas with high energy, thereby raising the temperature of the combustion gas up to the heat-resistant limit of the combustor and turbine parts through an isothermal combustion process.

Figure 2:
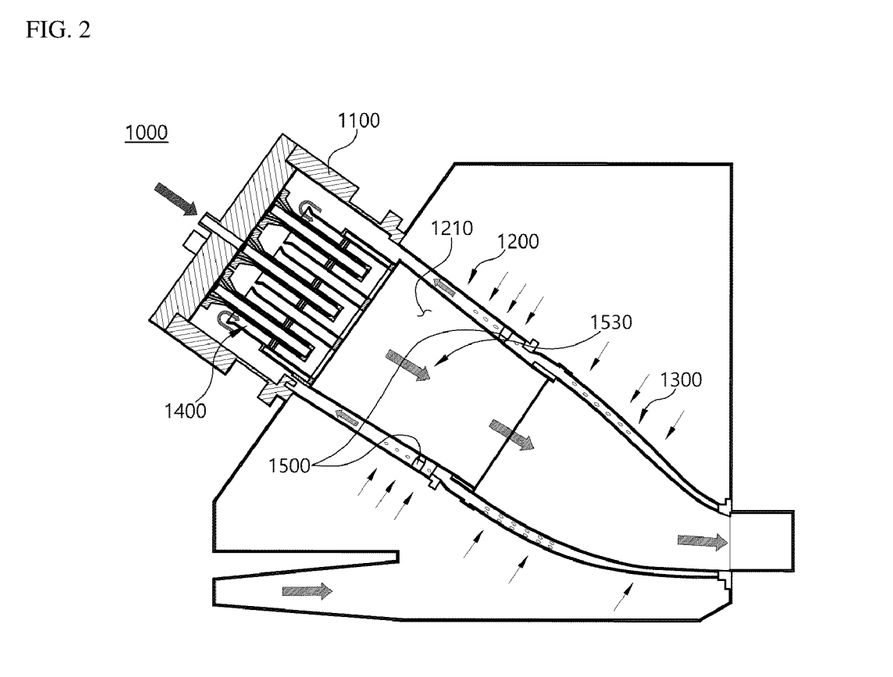
FIG. 2 is an enlarged cross-sectional view illustrating a combustor provided in the gas turbine illustrated in FIG. 1.

Referring to FIGS. 1 and 2, the combustor 1000 includes a nozzle casing 1100, a liner 1200, a transition piece 1300, a nozzle assembly 1400, and a jet nozzle 1500.

The nozzle assembly 1400 is disposed inside of the nozzle casing 1100 to inject fuel and compressed air. The liner 1200 is disposed at the downstream end of the nozzle casing 1100 and is connected to a turbine section 120 through the transition piece 1300, when the downstream direction is defined by a flow direction of the combustion gas. The liner 1200 internally has a combustion chamber 1210 in which a mixture of fuel supplied from a fuel injector (not shown) and compressed air supplied from the compressor 110 is combusted.

The transition piece 1300 is disposed at the downstream end of the liner 1200 and is connected to a turbine section 120 to supply combustion gas generated in the combustion chamber 1210 to the turbine section 120, when the downstream direction is defined by a flow direction of the combustion gas.

Specifically, the liner 1200 provides a combustion space in which a mixture of fuel and compressed air injected from the nozzle assembly 1400 are burned. The liner 1200 includes a combustion chamber 1210 that provides the combustion space in which the fuel mixed with air is burned, and an annular flow path that forms an annular space while surrounding the combustion chamber 1210. In addition, it is preferred that the nozzle assembly 1400 is coupled to the front side of the liner 1200 (i.e., the upstream end of the liner 1200) and an igniter (not shown) is coupled to the sidewall of the liner.

In the annular flow path of the liner 1200, compressed air is introduced through a plurality of holes provided in an outer wall of the liner 1200 and flows toward the nozzle assembly. In the annular flow path of the liner 1200, the compressed air that cooled the transition piece 1300 also flows toward the nozzle assembly. The transition piece 1300 is described later. As such, as the compressed air flows along the outer wall of the liner 1200 through the annular flow path of the liner 1200, the liner 1200 is protected from being thermally damaged by heat generated by the combustion of fuel in the combustion chamber.

The transition piece 1300 is connected to the rear side of the liner 1200 (i.e., the downstream end of the liner 1200) so that the combustion gas burned by an ignition plug in the combustion chamber can be transferred to the turbine side. Similar to the liner 1200, the transition piece 1300 has an annular flow path surrounding an inner space of the transition piece 1300, which is formed inside the transition piece 1300. As the compressed air flows along the annular flow path of the transition piece 1300, the outer wall of the transition piece is cooled and protected from damage due to high temperature of the combustion gas.

Meanwhile, the high-temperature and high-pressure combustion gas from the combustor 1000 is supplied to the turbine section 120 described above. The high-temperature and high-pressure combustion gas supplied to the turbine section 120 expands while passing through the inside of the turbine section 120, and accordingly, impulses and reaction forces are applied to the turbine blades, which will be described later, to generate rotational torque. The resultant rotational torque is transmitted to the compressor through the above-described torque tube, and an excess of the power required to drive the compressor is used to drive a generator or the like.

The turbine section 120 is basically similar to the structure of a compressor 110. That is, the turbine section 120 is also provided with a plurality of turbine rotors similar to the compressor rotor of the compressor 110. Thus, the turbine rotor includes a turbine disk and a plurality of turbine blades radially disposed around the turbine disk. The plurality of turbine vanes is also annually arranged, on the basis of the same stage, on the turbine casing between adjacent stages of turbine blades to guide a flow direction of the combustion gas, which passed through the turbine blades. Here, the turbine casing and the turbine vanes may be collectively defined as a turbine stator to distinguish them from the turbine rotor.

Figure 5:
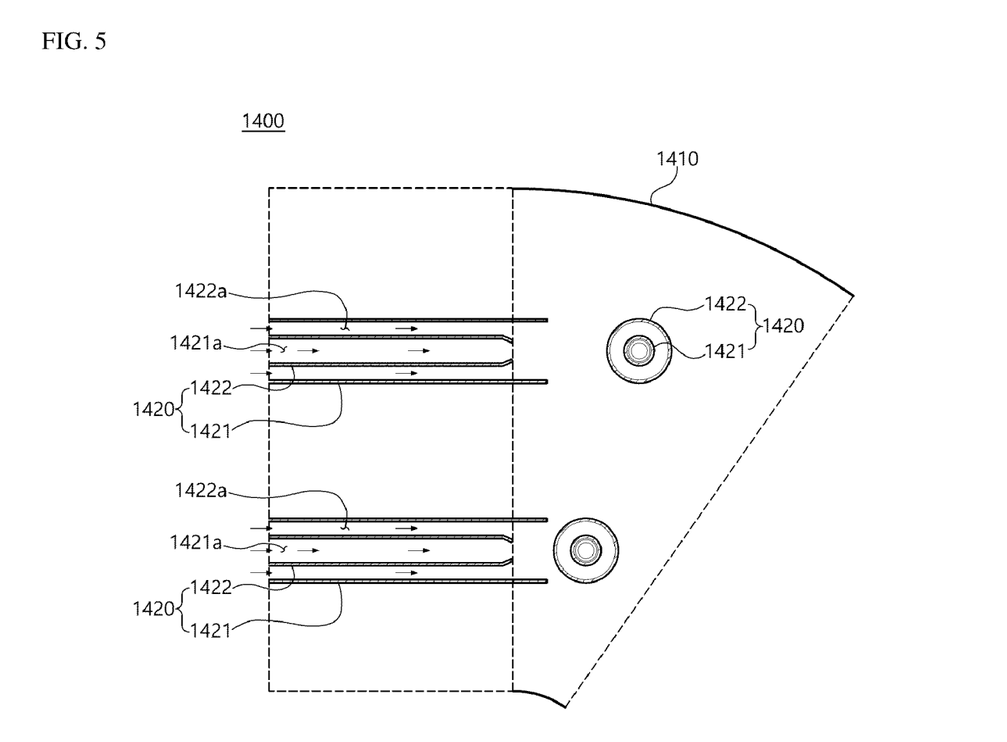
FIG. 5 is an enlarged view illustrating a portion of a nozzle assembly provided in the combustor illustrated in FIG. 2.

Referring to FIGS. 2 and 5, the nozzle assembly 1400 includes a nozzle body 1410 and an injection nozzle 1420.

In FIG. 5, the drawing is depicted in a combined manner of two schematic views of the nozzle assembly 1400 for the benefit of understanding. That is, the left half drawing of the drawing in FIG. 5 schematically shows a cross-section of the injection nozzle 1420 in the nozzle assembly 1400 when viewed from a later side of the injection nozzle such that the left end of the left half drawing shows an upstream of the injection nozzle 1420 and the right end of the left half drawing is a downstream of the injection nozzle 1420. On the other hand, the right half drawing of the drawing in FIG. 5 schematically shows a portion of a cross-section of the nozzle body 1410 in the nozzle assembly 1400 when viewed in a direction from a downstream end or an outlet of the injection nozzle 1420 toward an upstream end or an inlet of the injection nozzle 1420. As an example, the drawing in FIG. 5 shows two injection nozzles 1420, one disposed nearer to the center of the cylindrical shape of the nozzle body 1410 than the other.

The nozzle body 1410 has a disc shape, only a portion of which is illustrated in FIG. 5. The nozzle body 1410 is disposed on the upstream side from the combustion chamber 1210 of the liner 1200 according to the flow direction of combustion gases. Accordingly, the nozzle body 1410 separates an internal space of the combustion chamber 1210 and the nozzle casing 1100 from each other.

The injection nozzle 1420 is installed in the nozzle body 1410 to inject fuel and compressed air into the combustion chamber 1210. The injection nozzle 1420 may be provided in plurality such that the multiple injection nozzles are inserted in the nozzle body 1410. The injection nozzle 1420 may include a first nozzle tube 1421 and a second nozzle tube 1422. The first nozzle tube 1421 may be a cylindrical member having a first flow path 1421a formed therein. The second nozzle tube 1422 may be a cylindrical-shaped member arranged to wrap around the first nozzle tube 1421 from a radially outer side of the first nozzle tube 1421 such that a second flow path 1422a is formed therebetween. The first nozzle tube 121 and the second nozzle tube 1422 may be disposed concentrically.

Figure 3:
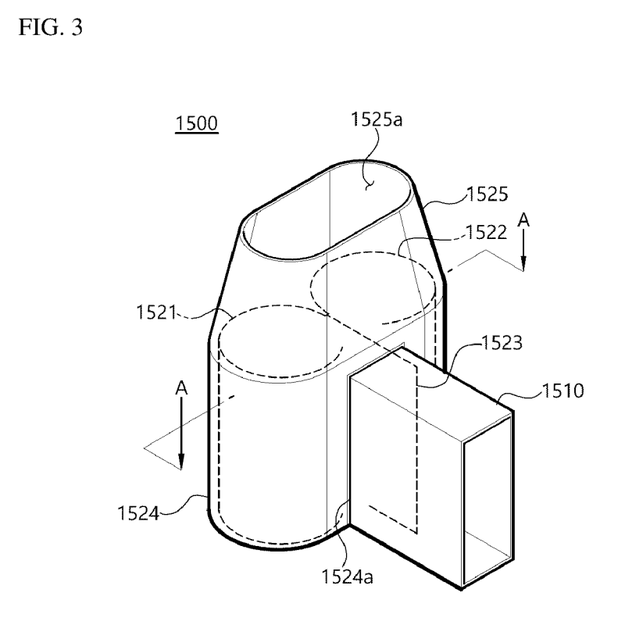
FIG. 3 is a perspective view illustrating a jet nozzle illustrated in FIG. 2.
Figure 4:
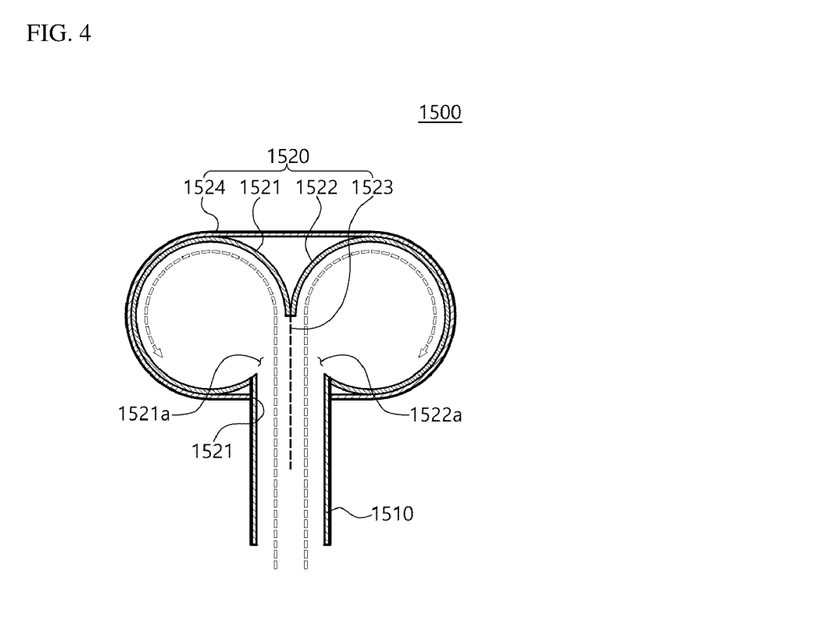
FIG. 4 is a cross-sectional view taken along lone A-A of FIG. 3, schematically illustrating a process of rotating compressed air introduced through a compressed air inlet in a reverse direction.

Referring now to FIGS. 2 to 4, the inner surface of the combustor 1000 is provided with a jet nozzle 1500. The jet nozzle 1500 serves to supply fluid into the interior of the liner 1200, in other words, into the combustion chamber 1210, in a direction intersecting with a progress direction of the combustion gas 1530 in the combustion chamber 1210 inside the liner 1200. The progress direction of the combustion gas 1530 is a direction from the injection nozzle 1420 toward the downstream end of the combustion chamber, in which the combustion gas generally flows toward the turbine section. On a peripheral side of the liner 1200, a communication port (not shown) may be formed which is in communication with the jet nozzle 1500. The fluid supplied through the jet nozzle 1500 may be introduced into the combustion chamber through the communication port (not shown). The peripheral side of the liner 1200 may mean an inner surface of the combustion chamber 1210, in other words, an inner surface of the liner 1200 facing the combustion chamber 1210. The communication port (not shown) may be preferably formed near to the downstream end of the liner 1200, to which the transition piece 1300 is connected. According to an embodiment, the communication port (not shown) may be formed at the downstream end of the peripheral side of the liner 1200. According to another embodiment, the communication port (not shown) may be formed at a position substantially close to the downstream end of the peripheral side of the liner 1200. According to yet another embodiment, the communication portion (not shown) may be formed to be relatively nearer to the downstream end of the liner 1200 than to the upstream end of the liner 1200.

The jet nozzle 1500 includes a fluid inlet 1510 and a fluid outlet 1520. A fluid is supplied from an outside of the jet nozzle 1500 through the fluid inlet 1510 and discharged into the combustion chamber 1210 through the fluid outlet 1520 and the communication port (not shown). According to an embodiment, the fluid may be supplied from outside of the combustor. The fluid to be supplied through the fluid inlet 1510 from the outside is preferably fuel or a mixture of fuel and air.

The fluid inlet 1510 is connected and in communication with the fluid outlet 1520. The fluid outlet 1520 includes a first outlet member 1521 and a second outlet member 1522. The first and second outlet members 1521 and 1522 may be in a cylindrical shape. A portion of the fluid may be supplied from the fluid inlet 1510 through the first outlet member 1521 and rotate in a first rotation direction in the first outlet member 1521. The rest of the fluid may be supplied from the fluid inlet 1510 through the second outlet member 1522 and rotate in a second rotation direction in the second outlet member 1522. The second rotation direction may be an opposite direction or a different direction from the first rotation direction.

Referring to FIGS. 3 and 4, the fluid outlet 1520 is disposed in an intersecting direction with respect to the direction in which fluid is introduced through the fluid inlet 1510, and the fluid outlet 1520 is connected with the communication port (not shown) to supply fluid into the interior of the liner 1200. The fluid outlet 1520 has a fluid outlet hole 1525a through which the fluid is discharged from the fluid outlet 1520. The fluid outlet hole 1525a communicates with the communication port (not shown). According to an embodiment, a direction in which the fluid is discharged from the fluid outlet 1520 intersects with a direction in which the fluid is introduced through the fluid inlet 1510. According to an embodiment, an axis of the cylindrical shape of the first outlet member 1521 and an axis of the cylindrical shape of the second outlet member 1522 may be parallel to each other and may be perpendicular to the a direction in which the fluid is introduced through the fluid inlet 1510. According to an embodiment, the fluid introduced from the fluid inlet 1510 may rotate in the first and second fluid outlet members 1521, 1522 while flows toward the fluid outlet hole 1525a.

Referring to FIG. 4, the first outlet member 1521 has a cylindrical shape having a closed end, an open end opposite to the closed end, and a first inlet part 1521a provided on a first peripheral side thereof in communication with the fluid inlet 1510. The fluid introduced into the first outlet member 1521 through the first inlet part 1521a is discharged toward the open end of the first outlet member 1521 while rotating in the first rotation direction according to a periphery of the first outlet member 1521.

The second outlet member 1522 also has a cylindrical shape having a closed end, an open end opposite to the closed end, and a second inlet part 1522a provided on a second peripheral side thereof in communication with the fluid inlet 1510. The fluid introduced into the second outlet member 1522 through the second inlet part 1522a is discharged toward the open end of the second outlet member while rotating in in the second rotation direction according to a periphery of the second outlet member 1522, which is different from or opposite to the first rotation direction.

The first outlet member 1521 and the second outlet member 1522 preferably have the same diameter. In addition, a partition wall 1523 may be provided at the connection of the first outlet member 1521 and the second outlet member 1522 or between the first outlet member 1521 and the second outlet member 1522 so as to extend toward the fluid inlet 1510. According to an embodiment, the partition wall 1523 may be extended toward the fluid inlet 1510 while being disposed in the middle of the fluid inlet 1510.

With the partition wall 1523 provided at the connection of the first outlet member 1521 and the second outlet member 1522 so as to extend toward the fluid inlet, a portion of the fluid introduced into the fluid inlet 1510 is supplied toward the first outlet member 1521, and the rest of the fluid is supplied toward the second outlet member 1522. In other words, the fluid introduced into the fluid inlet 1510 may be divided by the partition wall 1523 such that a portion of the fluid is introduced into the first outlet member 1521 and the rest of the fluid is introduced in to the second outlet member 1522. The partition wall 1523 is preferably disposed in a central portion of the fluid inlet 1510.

The first outlet member 1521 and the second outlet member 1522 are preferably disposed symmetrically with respect to the partition wall 1523 such that the first inlet part 1521a and the second inlet part 1522a provided on peripheral surfaces of the first outlet member 1521 and the second outlet member 1522 are disposed adjacent to the partition wall 1523.

Although it is described that the partition wall 1523 is provided at the connection of the first outlet member 1521 and the second outlet member 1522 so as to extend toward the fluid inlet 1510 so that a portion of the fluid introduced into the fluid inlet 1510 is supplied toward the first outlet member 1521 and the rest of the fluid is supplied toward the second outlet member 1522, the present disclosure is not limited thereto, and in other embodiment, the fluid may be supplied toward the first outlet member 1521 and the second outlet member 1522 by a portion protruding from the connection of the first outlet member and the second outlet member.

The fluid outlet 1520 may further include a casing 1524 having a closed end, on which the closed ends of the first outlet member 1521 and the second outlet member 1522 are seated, and an open end opposite to the closed end of the casing 1524.

The casing 1524 is preferably provided on a peripheral side thereof with an elongated through-hole 1524a, through which the fluid inlet 1510 is fitted in communication with the first inlet part 1521a of the first outlet member 1521 and the second inlet part 1522a of the second outlet member 1522. The through-hole 1524a preferably has a shape corresponding to the shape of the fluid inlet 1510.

According to an embodiment, a guide part 1525 may be formed at the open end of the casing 1524 and at the open end of the first and second outlet member 1521, 1522 to extend at an inclined angle toward an interior of the casing 1524 from a point where the open ends of the first and second outlet members 1521 and 1522 are located in order to guide the fluid discharged through the open ends of the first outlet member 1521 and the second outlet member 1522 toward the central portion of the casing 1524. The guide part 1525 is provided at a distal end of the casing 1524 with the fluid outlet hole 1525a, through which fluid is discharged to the outside of the casing 1524. In other words, the guide part 1525 may be formed at an inclined angle such that its cross-sectional area become smaller toward the fluid outlet hole 1525a and the fluid is more concentrated into its center of the flowing. The fluid outlet hole 1525a is in communication with the communication port (not shown) provided on the peripheral surface of the liner 1200.

In the jet nozzle 1500, fluid is supplied into the interior of the liner 1200 of the combustor 1000 through the communication port (not shown) formed on the peripheral surface of the liner in a direction intersecting with a progress direction of combustion gases that is moved to the turbine section 120 in the interior of the liner 1200 after being primarily combusted. In other words, the air and fuel mixture discharged from the nozzle assembly into the combustion chamber may be primarily combusted to generate a combustion gas before the combustion gas meets the fluid provided by the jet nozzle 1500. When the primarily combusted combustion gas meets the fluid provided by the jet nozzle 1500, second combustion can be carried out in the interior of the liner 1200, thereby increasing combustion efficiency. In particular, the second combustion may be carried out near or at the surface of the liner 1200 facing the combustion chamber 1210 by the fluid introduced through the jet nozzle 1500 disposed on the inner surface of the combustion chamber 1210, in other words, on the inner surface of the liner 1200 facing the combustion chamber 1210. According to an embodiment, the second combustion may be carried out particularly with respect to the primarily combusted combustion gas that flows near and along the inner surface of the combustion chamber 1210.

Furthermore, according to the embodiments of this disclosure, since the fluid supplied from the jet nozzle 1500 rotates in different directions through the first outlet member 1521 and the second outlet member 1522 while being supplied into the combustion chamber, the mixing rate of combustion gases and fuel may be further increased.

Although the present disclosure has been described with reference to the embodiments illustrated in the drawings, the described embodiments are merely illustrative, so those skilled in the art will understand that various modifications and equivalents thereof can be made therefrom. Therefore, the true technical scope of the present disclosure should be determined by the technical spirit of the appended claims. Also, it is noted that any one feature of an embodiment of the present disclosure described in the specification may be applied to another embodiment of the present disclosure.

The invention claimed is:

1. An apparatus comprising a jet nozzle formed on an inner surface of a combustor to supply fluid into an interior of a liner of the combustor in a direction intersecting with a progress direction of combustion gases primarily combusted in a combustion chamber, the jet nozzle comprising:
a fluid inlet, through which fluid is introduced in a first direction, the fluid inlet comprising walls extending along the first direction; and
a fluid outlet including a first outlet member in a first cylindrical shape, through which a portion of the fluid introduced through the fluid inlet is discharged so as to be rotated in a first rotational direction, and a second outlet member in a second cylindrical shape, through which the rest of the fluid is discharged so as to be rotated in a second rotational direction which is opposite to the first rotational direction,
wherein the first cylindrical shape and the second cylindrical shape comprise respective cylindrical axes extending along a second direction perpendicular to the first direction, and the cylindrical axis of the first cylindrical shape and the cylindrical axis of the second cylindrical shape are spaced apart from each other in a third direction which is perpendicular to the first direction and the second direction.

2. The apparatus according to claim 1, wherein the fluid is fuel or a fuel mixture, wherein a bottom end of the first cylindrical shape and a bottom end of the second cylindrical shape are in a same first virtual plane and a top end of the first cylindrical shape and a top end of the second cylindrical shape are in a same second virtual plane.

3. The apparatus according to claim 1, wherein the first cylindrical shape has a closed end, an open end opposite to the closed end, and a first inlet part provided on a first peripheral side of the first cylindrical shape in communication with the fluid inlet, and the second cylindrical shape has a closed end, an open end opposite to the closed end, and a second inlet part provided on a second peripheral side of the second cylindrical shape in communication with the fluid inlet, so that the fluid introduced into the first outlet member and the second outlet member through the first inlet part and the second inlet part is discharged through the open ends of the first and second outlet members,
wherein both the first inlet part of the first cylindrical shape and the second inlet part of the second cylindrical shape receive the fluid flowing in a same direction.

4. The apparatus according to claim 3, wherein the first outlet member and the second outlet member have the same diameter, and a partition wall is provided at a connection of the first outlet member and the second outlet member so as to extend toward the fluid inlet, wherein the first outlet member and the second outlet member are disposed symmetrically with respect to the partition wall.

5. The apparatus according to claim 3, wherein the fluid outlet further comprises a casing in which the first outlet member and the second outlet member are seated, the casing including a closed end, an open end opposite to the closed end, and an elongated through-hole provided on a peripheral side of the casing, through which the fluid inlet is fitted in communication with the first and second inlet parts.

6. The apparatus according to claim 5, wherein a guide part is integrally formed at the open end of the casing to extend at an inclined angle toward an interior of the casing from a point where the open ends of the first and second outlet members are located in order to guide the discharge of the fluid, wherein a fluid outlet hole is provided at a distal end of the guide part.

7. The apparatus according to claim 1, wherein the portion of the fluid introduced through the fluid inlet is rotated around the cylindrical axis of the first cylindrical shape, and the rest of the fluid is rotated around the cylindrical axis of the second cylindrical shape.

8. The apparatus according to claim 1, wherein the portion of the fluid introduced through the fluid inlet is rotated along an inner circumferential surface of the first cylindrical shape, and the rest of the fluid is rotated along an inner circumferential surface of the second cylindrical shape.

9. A combustor provided to mix compressed air supplied from a compressor of a gas turbine and fuel supplied from a fuel injector to form a compressed air-fuel mixture, to combust the mixture to produce combustion gases, and to supply the combustion gases to a turbine section of the gas turbine, the combustor comprises:
a nozzle casing;
a liner connected to a turbine section-side end of the nozzle casing and having a combustion chamber in which the compressed air-fuel mixture is combusted;
a transition piece connected to a turbine section-side end of the liner to supply combustion gas generated in the combustion chamber to the turbine section;
a nozzle assembly disposed in the nozzle casing to inject fuel and compressed air into the combustion chamber; and
a jet nozzle configured to supply fluid into an interior of the liner in a direction intersecting with a progress direction of combustion gases primarily combusted in the combustion chamber, the jet nozzle comprising:
a fluid inlet, through which fluid is introduced in a first direction, the fluid inlet comprising walls extending along the first direction; and
a fluid outlet including a first outlet member in a first cylindrical shape, through which a portion of the fluid introduced through the fluid inlet is discharged so as to be rotated in a first rotational direction, and a second outlet member in a second cylindrical shape, through which the rest of the fluid is discharged so as to be rotated in a second rotational direction which is opposite to the first rotational direction,
wherein the first cylindrical shape and the second cylindrical shape comprise respective cylindrical axes extending along a second direction perpendicular to the first direction, and the cylindrical axis of the first cylindrical shape and the cylindrical axis of the second cylindrical shape are spaced apart from each other in a third direction which is perpendicular to the first direction and the second direction.

10. The combustor according to claim 9, wherein the fluid is fuel or a fuel mixture,
wherein a bottom end of the first cylindrical shape and a bottom end of the second cylindrical shape are in a same first virtual plane and a top end of the first cylindrical shape and a top end of the second cylindrical shape are in a same second virtual plane.

11. The combustor according to claim 9, wherein the first cylindrical shape has a closed end, an open end opposite to the closed end, and a first inlet part provided on a first peripheral side of the first cylindrical shape in communication with the fluid inlet, and the second cylindrical shape has a closed end, an open end opposite to the closed end, and a second inlet part provided on a second peripheral side of the second cylindrical shape in communication with the fluid inlet, so that the fluid introduced into the first outlet member and the second outlet member through the first inlet part and the second inlet part is discharged through the open ends of the first and second outlet members, wherein both the first inlet part of the first cylindrical shape and the second inlet part of the second cylindrical shape receive the fluid flowing in a same direction.

12. The combustor according to claim 11, wherein the first outlet member and the second outlet member have the same diameter, and a partition wall is provided at a connection of the first outlet member and the second outlet member so as to extend toward the fluid inlet, wherein the first outlet member and the second outlet member are disposed symmetrically with respect to the partition wall.

13. The combustor according to claim 11, wherein the fluid outlet further comprises a casing in which the first outlet member and the second outlet member are seated, the casing including a closed end, an open end opposite to the closed end, and an elongated through-hole provided on a peripheral side of the casing, through which the fluid inlet is fitted in communication with the first and second inlet parts.

14. The combustor according to claim 13, wherein a guide part is integrally formed at the open end of the casing to extend at an inclined angle toward an interior of the casing from a point where the open ends of the first and second outlet members are located in order to guide the discharge of the fluid, wherein a fluid outlet hole is provided at a distal end of the guide part.

15. A gas turbine comprising:
a compressor provided to compress air;
a combustor provided to mix the compressed air supplied from the compressor with fuel supplied from a fuel injector and combust the air-fuel mixture; and
a turbine section provided to generate power for generating electricity while the combustion gases supplied from the combustor flow therethrough, the combustor comprising:
a nozzle casing;
a liner connected to a turbine section-side end of the nozzle casing and having a combustion chamber in which the compressed air-fuel mixture is combusted;
a transition piece connected to a turbine section-side end of the liner to supply the combustion gases generated in the combustion chamber to the turbine section;
a nozzle assembly disposed in the nozzle casing to inject fuel and compressed air into the combustion chamber; and
a jet nozzle configured to supply fluid into an interior of the liner in a direction intersecting with a progress direction of the combustion gases primarily combusted in the combustion chamber, the jet nozzle comprising:
a fluid inlet, through which fluid is introduced in a first direction, the fluid inlet comprising walls extending along the first direction; and
a fluid outlet including a first outlet member in a first cylindrical shape, through which a portion of the fluid introduced through the fluid inlet is discharged so as to be rotated in a first rotational direction, and a second outlet member in a second cylindrical shape, through which the rest of the fluid is discharged so as to be rotated in a second rotational direction which is opposite to the first rotational direction,
wherein the first cylindrical shape and the second cylindrical shape comprise respective cylindrical axes extending along a second direction perpendicular to the first direction, and the cylindrical axis of the first cylindrical shape and the cylindrical axis of the second cylindrical shape are spaced apart from each other in a third direction which is perpendicular to the first direction and the second direction.

16. The gas turbine according to claim 15, wherein the fluid is fuel or a fuel mixture,
wherein a bottom end of the first cylindrical shape and a bottom end of the second cylindrical shape are in a same first virtual plane and a top end of the first cylindrical shape and a top end of the second cylindrical shape are in a same second virtual plane.

17. The gas turbine according to claim 15, wherein the first cylindrical shape has a closed end, an open end opposite to the closed end, and a first inlet part provided on a first peripheral side of the first cylindrical shape in communication with the fluid inlet, and the second cylindrical shape has a closed end, an open end opposite to the closed end, and a second inlet part provided on a second peripheral side of the second cylindrical shape in communication with the fluid inlet, so that the fluid introduced into the first outlet member and the second outlet member through the first inlet part and the second inlet part is discharged through the open ends of the first and second outlet members,
wherein both the first inlet part of the first cylindrical shape and the second inlet part of the second cylindrical shape receive the fluid flowing in a same direction.

18. The gas turbine according to claim 17, wherein the first outlet member and the second outlet member have the same diameter, and a partition wall is provided at a connection of the first outlet member and the second outlet member so as to extend toward the fluid inlet, wherein the first outlet member and the second outlet member are disposed symmetrically with respect to the partition wall.

19. The gas turbine according to claim 17, wherein the fluid outlet further comprises a casing in which the first outlet member and the second outlet member are seated, the casing including a closed end, an open end opposite to the closed end, and an elongated through-hole provided on a peripheral side of the casing, through which the fluid inlet is fitted in communication with the first and second inlet parts.

20. The gas turbine according to claim 19, wherein a guide part is integrally formed at the open end of the casing to extend at an inclined angle toward an interior of the casing from a point where the open ends of the first and second outlet members are located in order to guide the discharge of the fluid, wherein a fluid outlet hole is provided at a distal end of the guide part.

* * * * *